Jan. 23, 1962     J. BÖNISCH ET AL     3,017,804
MOTION PICTURE CAMERA AND ATTACHMENT THEREFOR
Filed Sept. 25, 1959     2 Sheets-Sheet 1
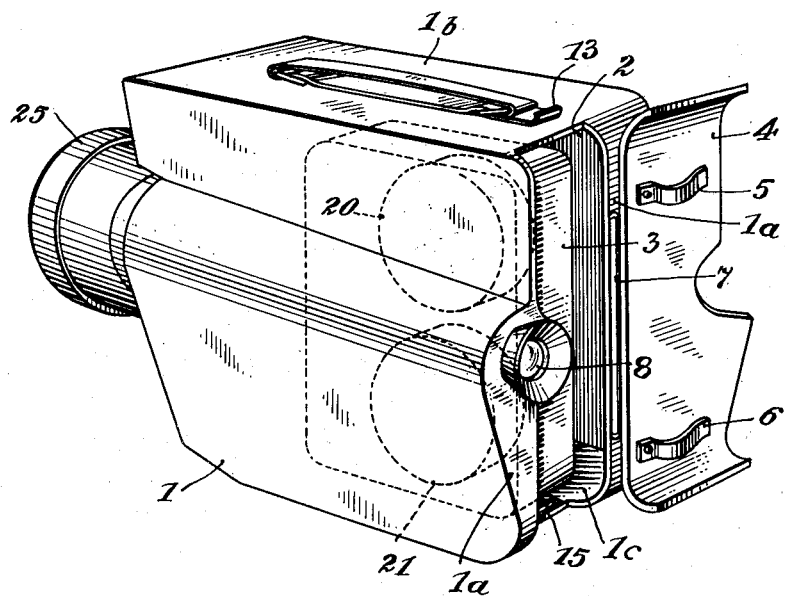
INVENTORS
Josef Bönisch
Herbert Göpfert
Wolfgang Planert
By *their* ATTORNEY

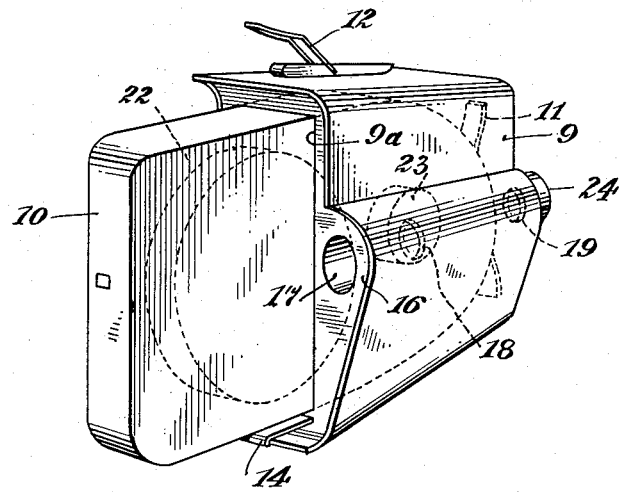
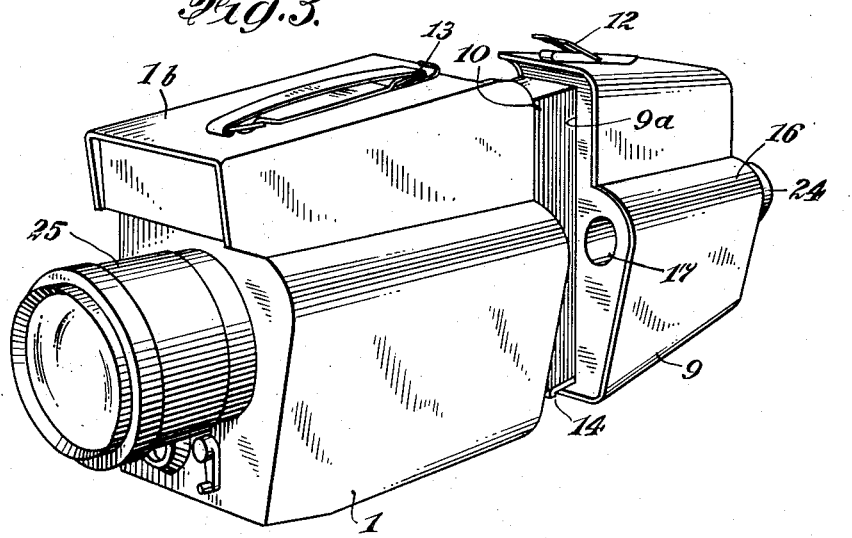

United States Patent Office 3,017,804
Patented Jan. 23, 1962

---

3,017,804
MOTION PICTURE CAMERA AND ATTACHMENT THEREFOR
Josef Bönisch, Herbert Gopfert, and Wolfgang Planert, all of Dresden, Germany, assignors to VEB Kamera- und Kinowerke Dresden, Dresden, Germany
Filed Sept. 25, 1959 Ser. No. 842,270
12 Claims. (Cl. 88—17)

The present invention relates to motion-picture cameras in general, and more particularly to a motion-picture camera of the type which can utilize film magazines of different dimensions containing films of different lengths.

It is already known to construct a motion-picture camera in such a way that it may be utilized in connection with magazines containing films of greatly varying lengths. It is customary to insert a smaller magazine into the body or casing of the camera while the larger magazine is attached externally to the camera body. Alternately, not only a large but also a comparatively small magazine or film receptacle may be attached to the outer side of the camera body.

A serious drawback of such motion-picture cameras is that at least one light-tight slot must be provided in the wall of the camera body to permit the passage of the film therethrough, and also that such arrangement requires additional transporting rollers in order to insure proper advance of the film from the magazine into the interior of the camera body and vice versa. In addition, the ocular of the direct vision finder is invariably mounted directly in, immediately adjacent to, or above the rear wall of the camera body. The users of such cameras are handicapped because it is rather difficult to place the eye close to the ocular since the magazine, too, is attached to and extends beyond the rear wall of the camera body. Particularly if the magazine is one of comparatively large dimensions, it extends so far beyond the rear wall that the photographer is actually unable to bring his eye close to the ocular or is capable of doing so only by assuming a very uncomfortable position. The resulting parallax, i.e., the displacement of the object due to the viewer's position, causes faulty setting of the camera, unsatisfactory centering of the viewed object, and consequent waste in film material.

An important object of the present invention is to provide a motion-picture camera for use with film magazines of different dimensions which is so constructed that the photographer is always free to place his eye into immediate proximity of the ocular forming part of the direct vision finder.

Another object of the invention is to provide a camera of the above outlined characteristics which is so constructed that the magazine is always fully enclosed regardless of its dimensions and regardless of the length of the film contained therein.

A further object of the instant invention is to provide an attachment for a motion picture camera of the just described type which is constructed in such a way as to constitute an extension of the camera body and which does not obstruct the user in placing his eye into immediate proximity of the ocular of the direct vision finder.

A concomitant object of the invention is to provide a motion-picture camera which is of very simple construction, whose body consists of a small number of component parts, and which may be readily and rapidly adapted for use with comparatively small or comparatively large film magazines.

With the above and certain other objects in view, the invention resides in the provision of a camera body or casing which defines a chamber of such dimensions as to fully receive a comparatively small film magazine or a portion of a comparatively large film magazine. When the camera utilizes a small magazine, a removable door seals the chamber against the entry of light whereas, if a comparatively large magazine is utilized, that portion of the magazine which extends from the chamber and beyond the rear wall of the camera body is received in a novel preferably hood-shaped attachment which may be removably secured to the camera body in a light-tight manner and comprises means defining a bore or passage for receiving one or more optical elements constituting an extension of the customary direct vision finder whose ocular is mounted on or at the rear wall of the camera body. Thus, when the camera utilizes a small magazine which is completely received in its body, the photographer may place his eye directly to the ocular at the rear wall of the camera body since the magazine is fully received in the latter and does not obstruct the access to the finder. However, when the camera utilizes a large film magazine whose outwardly extending portion is received in the chamber of the aforementioned attachment, the photographer places his eye to the rear end of the latter's bore which thus forms an extension of the direct vision finder and, again, the proper centering of the object is insured at all times.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 1 is a perspective view of the motion-picture camera with a small film magazine inserted into its body and the removable door shown in open position;

FIG. 2 is a perspective view of the attachment partially receiving a comparatively large film magazine; and FIG. 3 is a perspective view of the camera in a position of partial assembly with the attachment and with the door removed.

Referring now in greater detail to the illustrated embodiment, and first to FIG. 1, there is shown a motion-picture camera having a body or casing 1 which defines a chamber 2 for the reception of a comparatively small film magazine 3, for example, one containing 25 feet of film. The chamber 2 may be sealed in light-tight manner by a door 4 which is pivotably and removably mounted on the rear wall 1a of the body 1 by a hinge 7. The inner side of the door 4 carries a pair of leaf springs 5, 6 whose purpose is to move the magazine 3 into operative position when the door 4 is closed. The ocular of the direct vision finder 8 is mounted in the rear wall 1a of the camera body 1; thus, when the door 4 is closed to seal the chamber 2 against the entry of light, a photographer can place his eye into immediate proximity of the finder. The finder 8 extends laterally along one side of the chamber 2.

The hood- or bonnet-shaped attachment 9 is shown in FIG. 2. Its interior constitutes a second chamber 9a which is so dimensioned as to receive the rear portion of a comparatively large film magazine 10 whose front portion is receivable in the chamber 2 of the camera body 1 (see FIG. 3). The rear wall of the attachment 9 supports at its inner side in the chamber 9a a leaf spring 11 which insures proper positioning of the magazine 10 when the attachment is connected to the rear wall 1a. The customary door labyrinth which prevents entry of light into the chamber 2 when the attachment is secured to the camera body 1 is not shown in the drawings. The means for connecting the attachment to the camera comprises an upwardly bent hooked retaining member 13 located above the top wall 1b of the camera body 1, a closed slot 15 formed in the bottom wall 1c of the camera body, a U-shaped member 12 pivotably connected to the top wall of the attachment 9, and a downwardly bent hook-shaped retaining member 14 which is fixed to the bottom wall of the attachment. Of course, any other suitable type of connecting means may be utilized, if desired.

The attachment is formed with a lateral extension 16 which defines a through bore 17 for reception of optical elements or lenses 18, 19. The forward end of the bore 17 is aligned with and is immediately adjacent to the ocular of the finder 8 when the attachment 9 is secured to the camera body 1.

As can be observed in FIG. 2, the comparatively large film magazine 10 contains a supply spool 22 which is extendable into the chamber 2 and a film core or take-up spool 23 which extends into the chamber 9a of the attachment 9. On the other hand, the comparatively small film magazine 3 of FIG. 1 contains a supply spool 20 and a take-up spool 21 which latter is located below the member 20, or vice versa. For example, the magazine 3 may contain 25 feet of an 8 or 16 mm. film whereas the larger magazine 10 may contain 100 feet of film. The smaller magazine 3 is also known as the double eight film magazine.

When the camera is to be utilized with the larger film magazine 10, the door 4 is taken off the hinge 7 and the small magazine 3 is then withdrawn from the chamber 2. The forward portion of the magazine 10 is then inserted into the chamber 2, whereupon the attachment 9 is pushed over the rearwardly extending portion of the member 10 (see FIG. 3). The aforementioned door labyrinth prevents the entry of light into the chamber 2 and into the interior of the attachment 9, and the latter is securely fixed to the camera body 1 by introducing the end of the retaining member 14 into the slot 15 and by thereupon pivoting the member 12 over the end portion of the retaining means 13. The resilient member 11 causes the magazine 10 to assume its required position in the chamber 2.

Alternately, the magazine 10 may be inserted into the chamber 9a of the attachment 9 (see FIG. 2) and into abutment with the resilient means 11 before being introduced into the chamber 2. As is shown in FIG. 3, the attachment 9 and the magazine 10 are then simultaneously pushed in a direction toward the rear wall 1a of the camera body until the front part of the attachment 9 comes into abutment with the wall 1a. The connection between the members 1, 9 is then completed by the engagement of parts 12, 13 and 14, 15.

When the attachment 9 is properly fixed to the camera body 1, the extension 16 is aligned with the ocular of the finder 8 and the photographer can place his eye to the rear end 24 of the extension 16 to observe the object which is to be photographed by the camera objective 25. Thus, any faulty setting of the camera or improper centering of the object and the likelihood of parallax is completely eliminated since the rear end of the finder in the camera body 1 or in the attachment 9 is always fully accessible regardless of the dimensions of the film magazine.

The camera may be transformed for use with a small magazine merely by disconnecting the attachment 9, by withdrawing the large magazine 10, by connecting the door 4 to the hinge 7, by inserting a small magazine into the chamber 2, and by sealing the chamber.

It will be readily understood that the finder 8 may be mounted on the top wall 1b of the camera body 1, and that the extension 16 is then placed at the top of the attachment 9.

Without further analysis the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a motion-picture camera, in combination: a camera body having a rear wall and an open chamber extending inwardly from said rear wall; an attachment releasably connectable to said body and defining a second chamber communicating with the first mentioned chamber through said rear wall, the dimensions of said first mentioned chamber being such as to receive a comparatively small film magazine, and the combined dimensions of said first mentioned and second chambers being such as to receive a comparatively large film magazine; means for releasably connecting the camera body with said attachment; a direct vision finder carried by said camera body and having an ocular adjacent to said rear wall; and an extension for said finder carried by said attachment and aligned with the finder when the attachment is connected to the camera body.

2. In a motion-picture camera, in combination: a camera body having a rear wall and an open chamber extending inwardly from said rear wall; a hood-shaped attachment releasably connectable to said body and defining a second chamber communicating with the first mentioned chamber through said rear wall, the dimensions of said first mentioned chamber being such as to receive a comparatively small film magazine, and the combined dimensions of said first mentioned and second chambers being such as to receive a comparatively large film magazine; means for releasably connecting the camera body with said attachment; a direct vision finder carried by said camera body and having an ocular adjacent to said rear wall; and an extension for said finder carried by said attachment and aligned with the finder when the attachment is connected to the camera body.

3. In a motion-picture camera, in combination: a camera body having a rear wall and an open chamber extending inwardly from said rear wall; an attachment releasably connectable to said body and defining a second chamber communicating with the first mentioned chamber through said rear wall, the dimensions of said first mentioned chamber being such as to receive a comparatively small film magazine, and the combined dimensions of said first mentioned and second chambers being such as to receive a comparatively large film magazine; means for releasably connecting the camera body with said attachment, said connecting means comprising first retaining members mounted on said camera body and second retaining members mounted on said attachment, the second retaining members releasably engaging with the first retaining members; a direct vision finder carried by said camera body and having an ocular adjacent to said rear wall; and an extension for said finder carried by said attachment and aligned with the finder when the attachment is connected to the camera body.

4. In a motion-picture camera, in combination: a camera body having a rear wall and an open chamber extending inwardly from said rear wall; an attachment releasably connectable to said body and defining a second chamber communicating with the first mentioned chamber through said rear wall, said attachment having a rear wall and at least one resilient member in the second chamber fixed to said last mentioned rear wall, the dimensions of said first mentioned chamber being such as to receive a comparatively small film magazine, and the combined dimensions of said first mentioned and second chambers being such as to receive a comparatively large film magazine; means for releasably connecting the camera body with said attachment; a comparatively large film magazine received in said chambers and biased by each said resilient member in a direction toward said first mentioned chamber; a direct vision finder carried by said camera body and having an ocular adjacent to said rear wall; and an extension for said finder carried by said attachment and aligned with the finder when the attachment is connected to the camera body.

5. In a motion-picture camera, in combination: a camera body having a rear wall and an open chamber extending inwardly from said rear wall; an attachment releasably connectable to said body and defining a second chamber communicating with the first mentioned chamber through said rear wall, said attachment having a rear wall distant from the rear wall of said camera body, the dimensions of said first mentioned chamber being such as to receive a comparatively small film magazine, and the combined dimensions of said first mentioned and second chambers being such as to receive a comparatively large film magazine; means for releasably connecting the camera body with said attachment; a direct vision finder carried by said camera body and having an ocular adjacent to said rear wall; and an extension for said finder carried by said attachment and aligned with the finder when the attachment is connected to the camera body, said extension being formed with a through bore having a first end adjacent to the ocular and a second end adjacent to the rear wall of said attachment.

6. In a motion-picture camera, in combination: a camera body having a rear wall and an open chamber extending inwardly from said rear wall; an attachment releasably connectable to said body and defining a second chamber communicating with the first mentioned chamber through said rear wall, the dimensions of said first mentioned chamber being such as to receive a comparatively small film magazine, and the combined dimensions of said first mentioned and said second chambers being such as to receive a comparatively large film magazine; means for releasably connecting the camera body with said attachment; a direct vision finder carried by said camera body and having an ocular adjacent to said rear wall; an extension for said finder carried by said attachment and aligned with the finder when the attachment is connected to said camera body; hinge means connected to said rear wall; and pivotable door means removably connectable to said hinge means for light-tightly sealing the first mentioned chamber.

7. In a motion-picture camera, in combination: a camera body having a rear wall and an open chamber extending inwardly from said rear wall; an attachment releasably connectable to said body and defining a second chamber communicating with the first mentioned chamber through said rear wall, the dimensions of said first mentioned chamber being such as to receive a comparatively small film magazine; and the combined dimensions of said first mentioned and said second chambers being such as to receive a comparatively large film magazine; means for releasably connecting the camera body with said attachment; a direct vision finder carried by said camera body and having an ocular adjacent to said rear wall; an extension for said finder carried by said attachment and aligned with the finder when the attachment is connected to said camera body; a comparatively small film magazine received in the first mentioned chamber, said magazine having film take-up and film supply spool means, one of said spool means being mounted above the other spool means; hinge means connected to said rear wall; and pivotable door means removably connectable to said hinge means for light-tightly sealing the film magazine in said first mentioned chamber.

8. In a motion-picture camera, in combination: a camera body having a rear wall and an open chamber extending inwardly from said rear wall; an attachment releasably connectable to said body and defining a second chamber communicating with the first mentioned chamber through said rear wall, the dimensions of said first mentioned chamber being such as to receive a comparatively small film magazine, and the combined dimensions of said first mentioned and said second chambers being such as to receive a comparatively large film magazine; means for releasably connecting the camera body with said attachment; a direct vision finder carried by said camera body and having an ocular adjacent to said rear wall; an extension for said finder carried by said attachment and aligned with the finder when the attachment is connected to said camera body; hinge means connected to said rear wall; pivotable door means removably connectable to said hinge means for light-tightly sealing the first mentioned chamber; and resilient means connected to said door means and extending into said first mentioned chamber when the latter is sealed by the door means.

9. In a motion-picture camera, in combination: a camera body having a rear wall and an open chamber extending inwardly from said rear wall; an attachment releasably connectable to said camera body and defining a second chamber communicating with the first mentioned chamber through said rear wall, the dimensions of said first mentioned chamber being such as to receive a comparatively small film magazine, and the combined dimensions of said first mentioned and second chambers being such as to receive a comparatively large film magazine; means for releasably connecting the camera body with said attachment; a comparatively large film magazine having a portion received in said first mentioned chamber and a second portion received in said second chamber, said first portion containing a first spool and said second portion containing a second spool; a direct vision finder carried by said camera body and having an ocular adjacent to said rear wall; and an extension for said finder carried by said attachment and aligned with the finder when the attachment is connected to said camera body.

10. In a motion-picture camera, in combination: a camera body having a rear wall and an open chamber extending inwardly from said rear wall; an attachment releasably connectable to said camera body and defining a second chamber communicating with the first mentioned chamber through said rear wall, the dimensions of said first mentioned chamber being such as to receive a comparatively small film magazine, and the combined dimensions of said first mentioned and second chambers being such as to receive a comparatively large film magazine; means for releasably connecting the camera body with said attachment; a comparatively large film magazine having a portion received in said first mentioned chamber and a second portion received in said second chamber, said first portion containing a first spool and said second portion containing a second spool; resilient means in said second chamber for constantly biasing the second portion in a direction to urge the first portion into said first mentioned chamber; a direct vision finder carried by said camera body and having an ocular adjacent to said rear wall; and an extension for said finder carried by said attachment and aligned with the finder when the attachment is connected to said camera body.

11. In a motion-picture camera, in combination: a camera body having a rear wall and an open chamber extending inwardly from said rear wall; an attachment releasably connectable to said body and defining a second chamber communicating with said first menttioned chamber through the rear wall of said camera body, the dimensions of said first mentioned chamber being such as to fully receive a comparatively small film magazine, and the combined dimensions of said first mentioned and said second chambers being such as to fully receive a comparatively large film magazine; means for releasably connecting the attachment to said camera body; a direct vision finder connected to and disposed laterally of said camera body, said finder having an ocular adjacent to said rear wall; and an extension for said finder connected to and disposed laterally of said attachment, the extension being aligned with said finder when the attachment is connected with said camera body.

12. In a motion-picture camera, in combination: a camera body having a rear wall and an open chamber extending inwardly from said rear wall; an attachment releasably connectable to said body and defining a second chamber communicating with said first mentioned chamber through the rear wall of said camera body, the dimensions of said first mentioned chamber being such as to fully receive a comparatively small film magazine, and the combined dimensions of said first mentioned and said second chambers being such as to fully receive a comparatively large film magazine; means for releasably connecting the attachment to said camera body; a direct vision finder connected to and disposed laterally of said camera body, said finder having an ocular adjacent to said rear wall; and an extension for said finder connected to and disposed laterally of said attachment, the extension having a through bore which is aligned with said finder when the attachment is connected with said camera body and at least one optical element in said bore.

References Cited in the file of this patent

UNITED STATES PATENTS

| | | |
|---|---|---|
| 1,870,464 | Ramsey | Aug. 9, 1932 |
| 1,979,159 | Howser | Oct. 30, 1934 |
| 2,184,331 | Becker et al. | Dec. 26, 1939 |
| 2,819,663 | Lachaize | Jan. 14, 1958 |